United States Patent
Yao et al.

[11] Patent Number: 6,003,364
[45] Date of Patent: Dec. 21, 1999

[54] GLIDE HEAD FOR TESTING A DISC SURFACE

[75] Inventors: Wei Hsin Yao; Ramesh Sundaram, both of Fremont, Calif.

[73] Assignee: Seagate Technology, Inc., Scotts Valley, Calif.

[21] Appl. No.: 09/145,681

[22] Filed: Sep. 2, 1998

Related U.S. Application Data

[60] Provisional application No. 60/078,657, Mar. 19, 1998.

[51] Int. Cl.$^6$ .................................................. G01B 13/22
[52] U.S. Cl. ............................................ 73/105; 360/103
[58] Field of Search .................... 73/105, 104; 360/103, 360/122

[56] References Cited

U.S. PATENT DOCUMENTS

| | | |
|---|---|---|
| 3,754,104 | 8/1973 | Piper et al. . |
| 4,532,802 | 8/1985 | Yeack-Scranton et al. . |
| 4,674,875 | 6/1987 | Koizumi . |
| 4,757,402 | 7/1988 | Mo . |
| 4,816,743 | 3/1989 | Harms et al. . |
| 4,853,810 | 8/1989 | Pohl et al. . |
| 4,881,136 | 11/1989 | Shiraishi et al. . |
| 4,901,185 | 2/1990 | Kubo et al. . |
| 4,942,609 | 7/1990 | Meyer . |

(List continued on next page.)

FOREIGN PATENT DOCUMENTS

| | | |
|---|---|---|
| 0 442 660A2 | 8/1991 | European Pat. Off. . |
| 54-23517 | 2/1979 | Japan . |
| 56-107363 | 8/1981 | Japan . |
| 59-193580 | 2/1984 | Japan . |
| 4-245054 | 9/1992 | Japan . |
| 8-069674 | 3/1996 | Japan . |
| 8-212740 | 8/1996 | Japan . |
| 8-279132 | 10/1996 | Japan . |
| 8-287440 | 11/1996 | Japan . |

OTHER PUBLICATIONS

"A Model for Mechanical Seals with Regular Microsurface Structure" by Etsion et al., Tribology Transactions vol. 39 (1996), 3, pp. 677–683.
"A Stiction Model for A Head–disk Interface of a Rigid Disk Drive" by Jing Gui et al., J. Appl. Phys., vol. 78, No. 6, Sep. 15, 1995 pp. 4206–4217.
"Increasing Mechanical Seals Life With Laser–Textured Seal Faces" by G. Halperin et al., Surface Surtech Technologies, LTD pp. 1–7 with (5 Figures). (undated).
"Magnetic Disk Storage System With Structured Magnetic Head Slider" IBM Technical Disclosure Bulletin vol. 27, No. 10A, Mar. 1985 pp. 5820–5821.
"Stiction Free Slider for the Smooth Surface Disk" by Y, Kasamatsu et al., IEEE Transactions on Magnetics, vol. 31, No. 6, Nov. 1995, pp. 2961–2963.

*Primary Examiner*—John E. Chapman
*Attorney, Agent, or Firm*—Westman, Champlin & Kelly, P.A.

[57] ABSTRACT

An improved glide head is useful for testing the glide quality of a disc. The glide head includes an air bearing surface, pads extending from the air bearing surface and a contact sensor, the contact sensor providing an output in response to an impact on the pad. The air-bearing surface defines a resting plane. The pad protrudes from the air-bearing surface such that the pad projects below the resting plane of the air-bearing surface.

20 Claims, 1 Drawing Sheet

U.S. PATENT DOCUMENTS

| | | |
|---|---|---|
| 5,010,429 | 4/1991 | Taguchi et al. . |
| 5,012,572 | 5/1991 | Matsuzawa et al. . |
| 5,020,213 | 6/1991 | Aronoff et al. . |
| 5,034,828 | 7/1991 | Ananth et al. . |
| 5,052,099 | 10/1991 | Taguchi et al. . |
| 5,063,712 | 11/1991 | Hamilton et al. . |
| 5,067,037 | 11/1991 | Ananth et al. . |
| 5,079,657 | 1/1992 | Aronoff et al. . |
| 5,162,073 | 11/1992 | Aronoff et al. . |
| 5,200,867 | 4/1993 | Albrecht et al. . |
| 5,202,803 | 4/1993 | Albrecht et al. . |
| 5,267,104 | 11/1993 | Albrecht et al. . |
| 5,270,882 | 12/1993 | Jove et al. . |
| 5,285,337 | 2/1994 | Best et al. . |
| 5,345,353 | 9/1994 | Krantz et al. . |
| 5,386,666 | 2/1995 | Cole . |
| 5,388,020 | 2/1995 | Nakamura et al. . |
| 5,396,386 | 3/1995 | Bolasna et al. . |
| 5,396,387 | 3/1995 | Murray . |
| 5,418,667 | 5/1995 | Best et al. . |
| 5,420,735 | 5/1995 | Haines . |
| 5,423,111 | 6/1995 | Mori . |
| 5,424,638 | 6/1995 | Huber . |
| 5,424,888 | 6/1995 | Hendriks et al. . |
| 5,490,027 | 2/1996 | Hamilton et al. . |
| 5,499,149 | 3/1996 | Dovek . |
| 5,508,861 | 4/1996 | Ananth et al. . |
| 5,526,204 | 6/1996 | French et al. . |
| 5,527,110 | 6/1996 | Abraham et al. . |
| 5,528,922 | 6/1996 | Baumgart et al. . |
| 5,537,034 | 7/1996 | Lewis . |
| 5,537,273 | 7/1996 | Hendriks et al. . |
| 5,550,691 | 8/1996 | Hamilton . |
| 5,550,693 | 8/1996 | Hendriks et al. . |
| 5,557,488 | 9/1996 | Hamilton et al. . |
| 5,572,386 | 11/1996 | Ananth et al. . |
| 5,612,839 | 3/1997 | Jacques . |
| 5,625,512 | 4/1997 | Smith . |
| 5,696,643 | 12/1997 | Tsuwako et al. . |
| 5,808,184 | 9/1998 | Boutaghou et al. . |
| 5,817,931 | 10/1998 | Boutaghou . |
| 5,825,181 | 10/1998 | Schaenzer et al. . |
| 5,942,680 | 8/1999 | Boutaghou ............... 73/105 |

GLIDE HEAD FOR TESTING A DISC SURFACE

CROSS REFERENCE TO RELATED APPLICATIONS

This application claims priority to U.S. provisional patent application Ser. No. 60/078,657, entitled "Using Head Pads For a Glide Avalanche Slider," filed on Mar. 19, 1998.

BACKGROUND OF THE INVENTION

The invention relates to glide heads for evaluating the glide quality of a disc surface, and to related methods. More particularly, the invention relates to glide heads that detect vibrations resulting from collisions of the slider with a defect on a disc surface.

Disc drives are used for storing information, typically as magnetically encoded data, and more recently as optically encoded data, on a disc surface. Glide tests are used to check disc surfaces for defects. Glide tests allow computer disc manufacturers to control and assure the quality of the disc media. Generally, all hard drive discs are tested before shipment. During a glide test, the glide head or slider flies over a disc surface generally at a predetermined clearance from the disc surface, known as the glide height or fly height.

If contact occurs between the glide head and a disc defect or asperity, the glide head vibrates and deforms. The vibrations can be measured with a piezoelectric transducer (PZT), which generates a potential difference between the electrodes of the PZT due to deformation of the transducer. Specifically, when the glide head interacts with a defect on the spinning disc, simultaneously excited vibrational modes of the PZT and the head result in voltages at corresponding frequencies. If the magnitude of measured voltages exceed predetermined threshold values, the disc may be rejected.

As storage densities on disc recording media become larger, fly heights of read/write heads generally become smaller. Lower fly heights impose narrower restrictions on acceptable magnitudes of defects on a disc surface since higher defects are more likely to result in contact between the read/write head and the disc. Contact between a read/write head and a disc generally results in damage to the head and/or to the disc. The glide quality of a disc directly relates to the ability of a head to fly adjacent the disc at a fixed distance from the disc without colliding with a significant defect on the disc that results in deformation of the head with a magnitude above a threshold value. The glide quality of a disc is related to the disc smoothness, although other defects also may alter glide quality.

As the tolerances on the disc smoothness (glide quality) decrease, glide heads must fly correspondingly closer to the disc surface in order to measure defects with elevations matching or exceeding the tolerance levels. Glide heads generally are designed to have a fly height that is sensitive to the linear velocity of the disc surface relative to the glide head. To achieve detection of smaller asperities on the disc surface, the disc velocity can be decreased to decrease the fly height of the glide head.

SUMMARY OF THE INVENTION

In one aspect, the invention features a glide head for testing the glide quality of a disc. The glide head includes an air bearing surface, at least one pad extending from the air bearing surface and a contact sensor providing an output in response to an impact on the pad. The air-bearing surface defines a resting plane. The pad protrudes from the air-bearing surface such that the pad projects below the resting plane of the air-bearing surface.

In another aspect, the invention features a glide tester including a spindle motor, an arm assembly drive, a glide head and a controller. The arm assembly drive has an arm that extends over a location over a disc surface when a disc is mounted on the spindle motor, the arm assembly drive is positioning the arm at different radial locations along a disc. The glide head has a pad protruding from the air bearing surface.

In another aspect, the invention features methods of evaluating the glide quality of a disc based on measurements of collisions of a glide head with disc defects using a glide head having a pad protruding from the air bearing surface.

DETAILED DESCRIPTION OF THE PREFERRED EMBODIMENTS

A glide head (i.e. slider) includes one or more pads extending from the air bearing surface to improve the performance of the glide head in the detection of disc defects. In particular, the pads are placed on the air bearing surface of the slider preferably such that when gliding, the pads extend toward the disc surface closer than the lower edge of the slider body. For most defects the pad becomes the point of contact of the glide head with an asperity.

Relative to the use of comparable glide heads without a pad, use of a pad can provide for a greater fly height of the glide head body over the disc, while detecting asperities of the same height. Thus, the disc can revolve at a greater RPM to yield a higher linear velocity of the disc surface relative to the glide head. A higher linear velocity results in a greater impact force with an asperity. Furthermore, the pads result in a more reproducible impact with an asperity of a particular height by providing a well defined contact point for a defect. Therefore, asperity detection using a glide head with pads results in asperity measurements with a greater signal-to-noise ratio and provides a more accurate prediction of the need to reject a disc.

Figure 1:
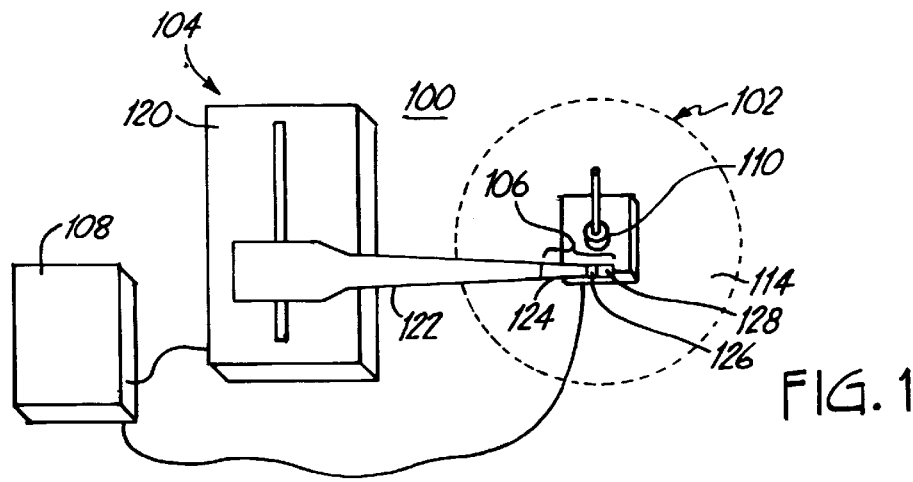
FIG. 1 is a schematic, top perspective view of an asperity detection apparatus incorporating a glide head, where a disc is shown with phantom lines such that structure below the disc is visible.

Referring to FIG. 1, a glide tester 100 includes a glide spinstand 102, an arm assembly drive 104, a suspension/glide head assembly 106 and a controller 108. Glide spinstand 102 includes a spindle motor 110 and disc 114, shown in phantom lines. Spindle motor 110 supports and spins disc 114. Arm assembly drive 104 has a motorized drive 120 and an arm 122. Arm 122 connects with motorized drive 120 and extends over disc 114. Motorized drive 120 moves arm 122 either by lateral motion or by rotational motion to alter the radial position of suspension/glide head assembly 106 along a disc 114 mounted on glide spinstand 102.

Suspension/glide head assembly 106 generally includes suspension 124, gimbal 126 and glide head 128. Suspension 124 connects with arm 122. Glide head 128 is connected to suspension 124 by way of gimbal 126. Suspension 124 and gimbal 126 can have a variety of designs including conventional structures.

Controller 108 is connected to arm assembly drive 104 and spindle motor 110. Controller 108 correlates the position of arm 122 with the rotational speed of the spindle motor to maintain the linear speed of glide head 128 to the disc surface approximately constant. Also, controller 108 correlates impact information detected by glide head 128 with a location on the disc 114.

Figure 2:
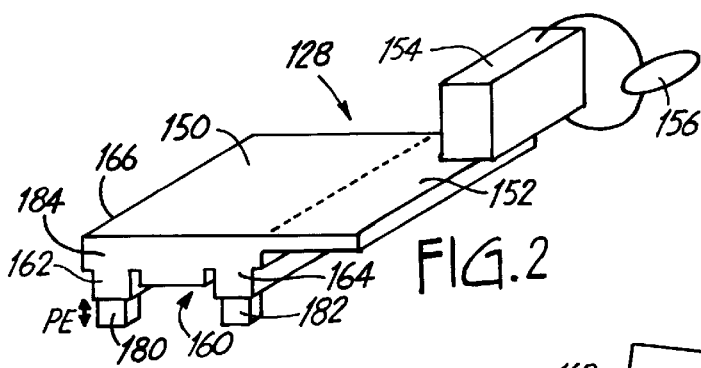
FIG. 2 is a schematic, side perspective view of a glide head with a PZT detector.

An embodiment of glide head 128 is depicted in FIG. 2. In this embodiment, glide head 128 has a body 150 with a wing 152 extending from the side of body 150. Wing 152 supports a piezoelectric transducer (PZT) 154. In alternative embodiments, a PZT is supported on the back of body 150, and wing 152 may be absent. Circuit 156 detects voltage changes across PZT 154 due to deformation of PZT 154. Circuit 156 can include a digital processor, or circuit 156 can involve analog circuits to detect values of the voltage exceeding threshold values. In a preferred embodiment, circuit 156 includes a preamplifier to increase the voltage levels from microvolts to millivolts, an A/D converter and a processor. The processor can be a digital signal processor or a general purpose microprocessor.

Figure 4:
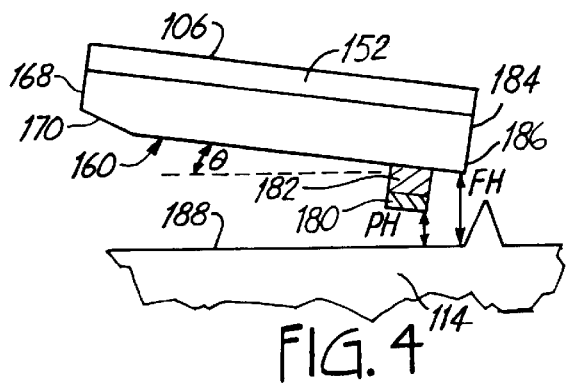
FIG. 4 is a schematic, side view of a glide head positioned over a fragmentary view of a disc with an asperity.
Figure 3:
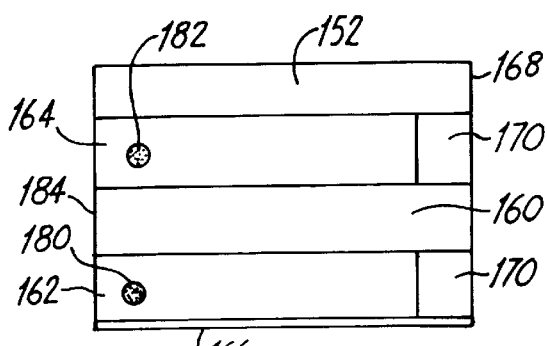
FIG. 3 schematic, bottom view of a glide head.

Referring to FIGS. 2–4, the glide head 128 has an air bearing surface 160. In a preferred embodiment, air bearing surface 160 includes a first rail 162 and a second rail 164. Air bearing surface 160 can incorporate additional rails, such as a center rail, and/or differently shaped rails, if desired. First rail 162 preferably is located near outer side 166, which is oriented toward the outer edge of disc 114 when glider head 128 is mounted in asperity testing apparatus 100. The rails generally define a nominal, planar surface or resting surface on which the slider would rest assuming that the pads were not present. When glide head 128 is flying over a spinning disc, aerodynamic forces can cause the leading side 168 to pitch upward at a slight angle θ, as depicted in exaggerated form in FIG. 4. Aerodynamic forces may also cause a slight roll, where outer side 166 is slightly lower relative to wing 152. Air bearing surface 160 can include an incline 170 at leading side 168, as shown in FIGS. 3 and 4.

Pads 180, 182 extend from air bearing surface 160 below the resting plane defined by rails 162, 164, as shown in FIGS. 2 and 4. A single pad can be used, or greater than two pads can be used, if desired. Pads 180, 182 can be placed anywhere on the air bearing surface 160 although certain locations are preferred. Preferably, pads 180, 182 are located, respectively, on rails 162, 164 near trailing side 184. Locating pads 180, 182 near the trailing side 184 provides a lower pad fly height for a given pad extension due to the pitch angle θ. The glider fly height is given by the distance from the lower edge 186 to the nominal disc surface 188. As shown in FIG. 4, asperity 190 can strike pad 180 but not lower edge 186.

Pad extension and pad fly height are greatly exaggerated in FIGS. 2–4 to demonstrate the general effectiveness of the use of pads. Preferably, the pad height is greater than about 10 nm and more preferably from about 15 nm to about 100 nm. Pad heights for pads 180, 182 can differ from each other, as shown in FIG. 4. The pads can have a variety of cross sectional shapes such as square, rectangular or elliptical. The pads generally have a cross sectional area from about 100 $\mu m^2$ to about 12,000 $\mu m^2$.

The use of two or more pads with different pad extensions can be used to grade the asperities on a disc surface based on the possibility that an asperity would strike the pad with the greater pad extension while missing the pad with the lesser pad extension indicating that the asperity has an intermediate height. Similar grading can be accomplished by locating multiple pads at different locations along a rail.

Generally, the pads can be formed by selective deposition of material to build-up the pad from the air-bearing surface or, preferably, by etching away a portion of the surface leaving pads extending from the etched away surface. Particular approaches may be better suited to produce pads with certain dimensions. In particular, a portion of the slider substrate can be etched away to leave behind the pads on the surface. The substrate can be made from material such as AlTiC. The substrate can be etched using ion-milling, reactive ion-milling or laser ablation. Laser ablation generally is performed with a pulsed laser, where the dimensions of the pads can be adjusted by varying the laser parameters including, for example, laser power, pulse duration and wavelength. To perform ion-milling or reactive ion-milling, the surface is patterned with photoresist at locations where the pads are to be located. The milling process removed substrate material where the photoresist is lacking. The photoresist is then removed to leave the raised areas of slider material.

An alternative approach has been described for the production of pads on read/write heads in copending and commonly assigned U.S. patent application Ser. No. 09/029276 to Gui et al., entitled "Slider For Disc Storage System," incorporated herein by reference. This approach can be used to produce pads on glide heads. For example, the slider body can be patterned with a vacuum compatible negative photoresist to coat the surface except at the future location of the pad(s). Then, for example, ion beam deposition can be used to deposit a coating of diamond-like carbon (DLC) over the same surface. The photoresist and its overcoat of DLC can be removed using an appropriate technique such as sodium bicarbonate blasting followed by a deionized water rinse. The pad is formed of DLC at locations initially lacking the photoresist. The deposition of the DLC can be performed anistropically to provide a desired shape to the pad surface, if desired. This approach generally is inexpensive and avoids the need for an adhesion layer.

In order for the systems to be useful to test discs with different tolerances, glide heads generally are designed to have fly heights that depend on the linear velocity of the glide head relative to the disc surface. The rotation rate generally is varied as the glide head is moved to different radial positions along the disc to maintain the relative linear velocity approximately constant. Based on the linear velocity of the glide head relative to the disc and the size of the pad, the rate for sweeping the head across the disc to get full coverage can be determined.

The fly height is selected such that the one or more pads would be expected to strike defects projecting higher than tolerance levels. Tolerance levels for glide head testing are generally set lower than tolerances established for glide quality in actual operation since fly heights during actual operation can be altered by additional factors including, for example, flutter of the spinning disc, spindle misalignment, high altitudes and temperature fluctuations. Since the pads generally extend below the lowest level of the body of the slider accounting for pitch, a higher fly height of the slider body can be used than would be possible without the pads.

For a particular slider design, a higher fly height of the slider body can be achieved by using a higher linear velocity of the glide head relative to the disc. A larger linear velocity results in a more energetic collision between the pads and a disc imperfection such that asperities are easier to detect. Thus, it is easier to discriminate actual collisions with defects from noise since the collisions result in larger signals. Also, a larger distance between the slider body and the disc surface results in less noise due to vibrations induced in the slider by interactions with the disc without actual contact.

Furthermore, the pads form a well defined target for collisions with a defect on the disc surface. The use of pads provides for a more consistent response since most defects of a certain height hit the pad at a relatively defined location. An increased linear velocity combined with a well defined target and a larger glider fly height results in an improved signal-to-noise ratio for the measurements. Since discs are rejected based on the PZT response, an improved signal to-noise ratio increases the accuracy of the measurement. In other words, if discs are rejected based on the magnitude of the PZT signal a reduced signal-to-noise ratio increases the number of discs below tolerance that are detected and rejected while decreasing the number of acceptable discs that are inappropriately rejected. In addition, it is easier to control the slider following a collision if the disc strikes a pad rather than the body of the slider.

The embodiments described above are intended to be exemplary and not limiting. Although the present invention has been described with reference to preferred embodiments, workers skilled in the art will recognize that changes can be made in form and detail without departing from the spirit and scope of the invention. For example, any type of contact sensor can be used including optical, capacitive, strain gage and others, and the invention is not limited to the piezoelectric sensor described herein.

What is claimed is:

1. A glide head comprising:

a means for detecting vibrations within a glide head; and a means for inducing vibrations within a glide head following collision with an object, the inducing means extending below a resting plane defined by the glide head absent the vibration inducing means.

2. A glide head comprising:

an air-bearing surface having a resting plane;

a pad protruding from the air-bearing surface, the pad projecting below the resting plane of the air-bearing surface; and a contact sensor, the contact sensor providing an output in response to an impact on the pad.

3. The glide head of claim 2 wherein the air bearing surface has a plurality of rails which define the resting plane.

4. The glide head of claim 2 wherein the pad comprises a different material than the other portions of the air bearing surface.

5. The glide head of claim 2 wherein the pad comprises diamond-like carbon.

6. The glide head of claim 2 wherein the pad comprises a material, and the remaining portions of the air bearing surface comprises the same material as the pad.

7. The glide head of claim 2 wherein the pad has a height from about 10 nm to about 100 nm.

8. The glide head of claim 2 further comprising an additional pad protruding from the air-bearing surface, the pad projecting below the resting plane of the air-bearing surface.

9. The glide head of claim 8 wherein the pad has the same height as the additional pad.

10. The glide head of claim 8 wherein the pad has a different height than the additional pad.

11. The glide head of claim 8 wherein the pad is located on a rail and the additional pad is located on a separate rail.

12. The glide head of claim 2 wherein the base includes a wing and the contact sensor is supported by the wing.

13. The glide head of claim 2 wherein the contact sensor is supported by the surface of the glide head opposite the air bearing surface.

14. The glide head of claim 2 wherein the contact sensor is a piezoelectric transducer.

15. A glide tester to test the glide quality of a disc, the glide tester comprising:

a spindle motor;

an arm assembly drive having an arm that extends over a location on a disc surface when a disc is mounted on the spindle motor, the arm assembly drive positioning the arm at different radial locations along a disc;

the glide head of claim 1 mounted on the arm of the arm assembly drive; and a controller controlling the operation of the spindle motor and the arm assembly drive.

16. A method of evaluating the glide quality of a disc, the method comprising measuring vibrations within a glide head resulting from contact between the disc while spinning and the glide head while the glide head is positioned near the spinning disc, the glide head having a pad protruding from a bottom air bearing surface such that the pad extends below the lowest point of the air bearing surface relative to the plane of the spinning disc.

17. The method of claim 16 wherein the disc is a magnetic disc for a hard drive.

18. The method of claim 16 wherein the glide head is mounted on an arm that extends over the disc and the arm is connected to a drive that laterally moves the glide head to alternative radial positions along the disc.

19. The method of claim 18 wherein the rotational speed of the disc is approximately adjusted to account for radial position of the slider such that the linear velocity of the disc relative to the glide head is approximately constant.

20. The method of claim 16 wherein the glide head is mounted on an arm that extends over the disc and the arm is connected to a drive that angularly moves the glide head to alternative radial positions along the disc.

* * * * *